(12) United States Patent
Geen (10) Patent No.: US 6,985,024 B2
(45) Date of Patent: Jan. 10, 2006

(54) VOLTAGE MULTIPLIER

(75) Inventor: John A. Geen, Tewksbury, MA (US)

(73) Assignee: Analog Devices, Inc., Norwood, MA (US)

( * ) Notice: Subject to any disclaimer, the term of this patent is extended or adjusted under 35 U.S.C. 154(b) by 1 day.

(21) Appl. No.: 10/645,161

(22) Filed: Aug. 21, 2003

(65) Prior Publication Data

US 2005/0040882 A1  Feb. 24, 2005

(51) Int. Cl.
  *H02M 3/18* (2006.01)
  *G05F 3/08* (2006.01)
(52) U.S. Cl. .......................... 327/536; 307/110; 363/59
(58) Field of Classification Search ................ 327/536; 307/110; 363/59, 60
  See application file for complete search history.

(56) References Cited

U.S. PATENT DOCUMENTS

| | | | | |
|---|---|---|---|---|
| 5,436,587 A | * | 7/1995 | Cernea | ........................ 327/536 |
| 5,635,776 A | * | 6/1997 | Imi | ............................. 307/110 |
| 6,249,445 B1 | * | 6/2001 | Sugasawa | ..................... 363/60 |
| 6,556,064 B1 | * | 4/2003 | Yatabe | ........................ 327/536 |
| 6,822,884 B1 | * | 11/2004 | Rosenthal et al. | ............ 363/59 |
| 2002/0109540 A1 | * | 8/2002 | Meng | ......................... 327/536 |

OTHER PUBLICATIONS

Ron Balczewski et al., Capacitive Voltage Multipliers: A High Efficiency Method to Generate Multiple On-Chip Supply Voltages, IEEE, pp. I-508-I-511, Sep. 2001.

* cited by examiner

*Primary Examiner*—Timothy P. Callahan
*Assistant Examiner*—Terry L. Englund
(74) *Attorney, Agent, or Firm*—Bromberg & Sunstein LLP (57) ABSTRACT

A voltage multiplier has a first stage that multiplies an input voltage, and a second stage that multiplies the output of the first stage. To that end, the voltage multiplier has the noted first stage having an input to receive the input voltage, and the second stage in series with the first stage. As noted above, the first stage is capable of multiplying the input voltage by a first amount to produce a first stage output voltage. The second stage thus has an input to receive the first stage output voltage. After receipt, the second stage is capable of multiplying the first stage output voltage by a second amount to produce a second stage output voltage.

8 Claims, 6 Drawing Sheets

*FIG. 1*

(PRIOR ART)

VOLTAGE MULTIPLIER

FIELD OF THE INVENTION

The invention generally relates to electronic devices and, more particularly, the invention relates to voltage multipliers.

BACKGROUND OF THE INVENTION

Circuits with relatively low supply voltages often require higher voltages to optimize performance. Micromachined gyroscopes, for example, are one such type of device that often require such higher voltages. More specifically, conventional micromachined gyroscopes typically have a relatively low supply voltage of between about 2.7 to 5.0 volts. As known by those in the art, many types of micromachined gyroscopes use their supply voltages to generate an actuation force that oscillates a mass. When the oscillating mass is rotated, it responds in an expected manner, which is detected and used to calculate rotational data. Without a sufficient actuation force, however, the mass will not oscillate enough to respond appropriately when rotated. Accordingly, micromachined gyroscopes typically use voltage multipliers to provide sufficiently large actuation voltages.

Voltage multipliers also provide a number of other benefits when used in micromachined gyroscopes. For example, to oscillate the mass, the actuation system in a gyroscope may have a large number of actuation fingers that electrostatically interact with corresponding fingers on the mass. The number of actuation fingers required for proper actuation, however, is roughly inversely proportional to the square of the actuation voltage. In other words, more actuation figures are required for lower actuation voltages, while fewer actuation fingers are required for higher actuation voltages. Consistent with one of the goals of micromachined technology, reducing the number of fingers desirably can reduce the overall size of the gyroscope. Accordingly, in micromachined gyroscope applications, it generally is desirable to multiply the supply voltage to a sufficiently high level that reduces the total number of actuation fingers.

Figure 1:
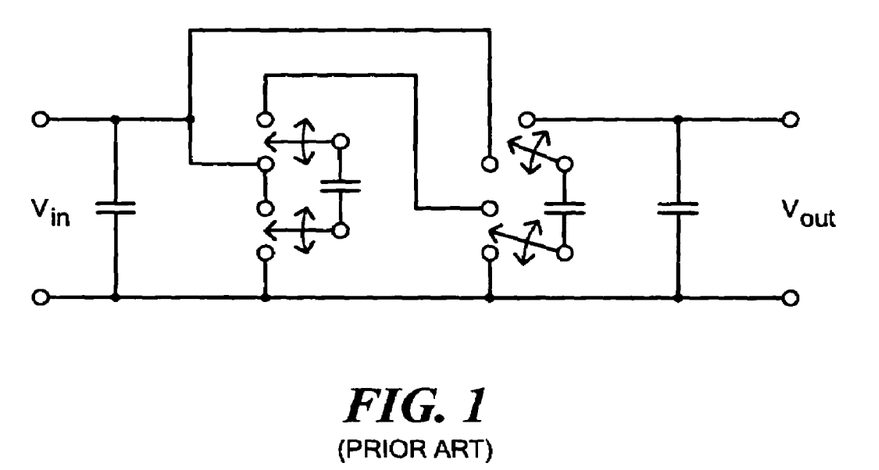
FIG. 1 schematically shows a prior art voltage multiplier.

Different types of voltage multipliers can be used for these purposes. FIG. 1 schematically shows one type of prior art voltage multiplier that can be used. Specifically, the voltage multiplier in FIG. 1 operates by connecting two capacitors in parallel across the supply voltage during one half cycle (a charging cycle), and then connecting them in series with the supply voltage during the other half cycle (a voltage multiplication cycle). With this scheme, the output voltage can be raised by increasing the number of switching capacitors to N, in which case the output voltage is approximately equal to the product of the input voltage Vin and (N+1). The voltage multiplier in FIG. 1 therefore uses two capacitors to triple the input voltage.

There are times when it is desirable to multiply the supply voltage by a relatively large amount. In such cases, the voltage multiplier of FIG. 1 may require a relatively large number of capacitors. Increasing the number of capacitors, however, increases the overall size of the gyroscope. In fact, it can effectively cancel out the space benefits derived from using fewer actuation fingers. As noted above, such a result is antithetical to the aim of minimizing the size of micromachined gyroscopes.

SUMMARY OF THE INVENTION

In accordance with one aspect of the invention, a voltage multiplier has a first stage that multiplies an input voltage, and a second stage that multiplies the output of the first stage. To that end, the voltage multiplier has the noted first stage having an input to receive the input voltage, and the second stage in series with the first stage. As noted above, the first stage is capable of multiplying the input voltage by a first amount to produce a first stage output voltage. The second stage thus has an input to receive the first stage output voltage. After receipt, the second stage is capable of multiplying the first stage output voltage by a second amount to produce a second stage output voltage.

In illustrative embodiments, the first amount and second amount equals about 2.0, and the voltage multiplier is a capacitive voltage multiplier. Moreover, the first stage may have a first capacitance and the second stage may have a second capacitance. Furthermore, the second stage may have an output capacitance that is periodically charged to the second stage output voltage about twenty-five percent of the total time that the voltage multiplier is operating. The first stage illustratively has a first associated switching speed, while the second stage has a second associated switching speed. The first switching speed may be a function of the second switching speed. For example, the first switching speed may be one of twice or half the speed of the second switching speed.

The voltage multiplier also may have a plurality of additional series stages coupled in series to the second stage. The plurality of additional stages has a final stage for producing a final output voltage that is the product of the input voltage and 2.0 to the Nth power. In this case, N equals the total number of stages, and the total number of stages includes the first stage, second stage, and plurality of additional stages. Each of the first, second and plurality of additional stages may have a capacitor that is switched between different nodes based upon a base frequency. The switching frequency of each stage may be one of double or half that of the immediately preceding stage. Moreover, at least one of the stages may have an output capacitor to provide an output voltage for that stage. The output voltage of that stage may be greater than that of the output voltage of each preceding stage.

In accordance with another aspect of the invention, a method of multiplying an input voltage couples a first capacitance to the input voltage in a manner that causes the voltage of the first capacitance to be substantially equal to the input voltage. The method also couples the first capacitance with a second capacitance in a manner that causes the second capacitance to charge to a second voltage. The second voltage is substantially equal to the sum of the input voltage and the voltage of the first capacitance. The method then switches the second capacitance to an output node. The output node then has an output voltage substantially equal to the sum of the input voltage and the voltages across the first and second capacitances.

The method may uncouple the first and second capacitances to permit the first capacitance to recharge to a voltage that is substantially equal to the input voltage. The method then may re-couple the first and second capacitances to produce the output voltage. In some embodiments, the first capacitance is serially coupled with the second capacitance to produce a series pair coupled to ground. By way of example, the output voltage may be about four times greater than the input voltage. Moreover, the first capacitance may have a first switching frequency while the second capacitance has a second switching frequency. The first switching frequency may be one of double or half that of the second switching frequency.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments, a voltage multiplier includes at least two cascaded stages that each multiplies a received voltage by a predetermined amount. More specifically, the input of each stage illustratively receives the output voltage generated by the immediately preceding stage. As a result, other than the first stage (which receives an input voltage), each stage multiplies a previously multiplied voltage. If each stage is a voltage doubler, for example, then the output voltage should be about equal to the product of the input voltage and two raised to the Nth power (subject to some reasonable tolerance, such as plus or minus twenty percent), were N equals the number of stages. Details of illustrative embodiments are discussed below.

Figure 2:
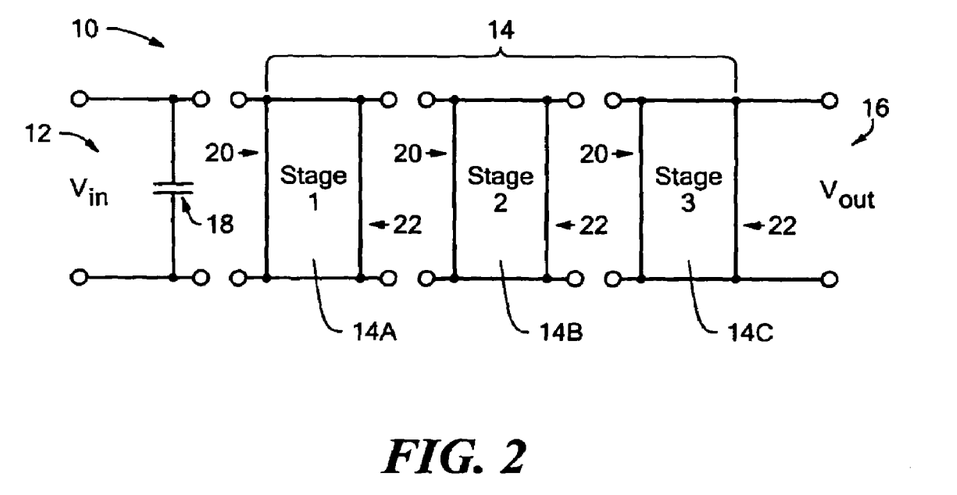
FIG. 2 schematically shows a block diagram of a voltage multiplier that may implement illustrative embodiments of the invention.

FIG. 2 schematically shows a block diagram of a three stage voltage multiplier 10 that may be used to implement illustrative embodiments of the invention. The voltage multiplier 10 includes an input port 12 for receiving a voltage to be multiplied (shown as Vin and having any reasonable value, such as 5 volts), a plurality of cascaded multiplication stages 14 for successively multiplying the input voltage Vin, and an output port 16 for delivering an output voltage (shown as Vout) produced by the multiplication stages 14. In addition, the voltage multiplier 10 optionally may have an input reservoir capacitor 18 for minimizing the effects of current surges.

The input voltage Vin may be any voltage, such as a supply voltage in a micromachined gyroscope. It nevertheless should be noted that discussion of the input voltage Vin as a supply voltage for a micromachined gyroscope is exemplary and, consequently, not intended to limit the scope of all embodiments of the invention. Accordingly, aspects of the invention may apply to other types of voltages and products that can use voltage multiplication. In a similar manner, discussion of the voltage multiplier 10 as having a specific number of stages 14 also is for descriptive purposes and not intended to limit the scope of the invention. Aspects of the invention therefore can have differing numbers of multiplication stages 14.

As shown in the drawings, each stage 14 has an input port 20 for receiving an input voltage, and an output port 22 for delivering an output voltage to the next stage 14. Accordingly, in the three stage voltage multiplier 10 shown, the first stage 14A multiplies the input voltage Vin, and delivers the product (i.e., the input voltage Vin multiplied by the multiplication factor of the first stage 14A) to the second stage 14B. In a corresponding manner, the second stage 14B multiplies the output voltage of the first stage 14A, and delivers its product to the third stage 14C. The third stage 14C, which in this case is the output stage, multiplies the voltage received from the second stage 14B, and delivers its product to the output of the voltage multiplier 10. This output voltage thus is the product of the multiplication factors of each stage 14 (i.e., the amount by which a given stage 14 multiplies its received voltage) and the input voltage Vin.

Each stage 14 illustratively multiplies the voltage it receives by an identical amount. For example, each stage 14 may double its received voltage. Other embodiments, however, may have various multiplication stages 14 with different multiplication factors. Moreover, some embodiments may employ disparate circuit architectures for multiplication stages 14 within a given voltage multiplier 10, while others may use a series of multiplication stages 14 with an identical circuit architecture.

Figure 3:
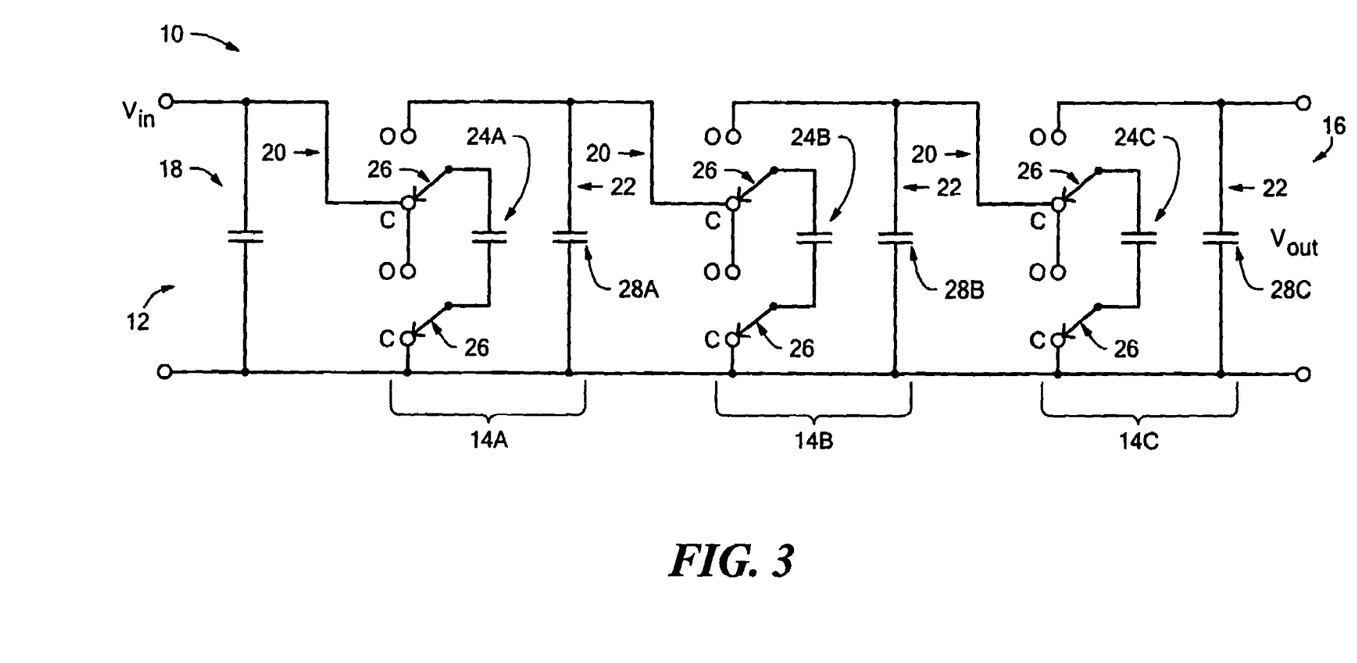
FIG. 3 schematically shows more details of a voltage multiplier that may incorporate illustrative embodiments of the invention.

Illustrative embodiments use an identical circuit architecture for each stage 14. FIG. 3 schematically shows more details of such a voltage multiplier 10, which, in this case, multiplies the input voltage Vin by about eight times (i.e., two raised to the Nth power, as discussed above, subject to some reasonable tolerance—note that even though tolerance is not discussed each time the output voltage is discussed, it may be implied in many embodiments). In a manner similar to the voltage multiplier 10 shown in FIG. 2, this voltage multiplier 10 has first, second and third stages 14A–14C. Each stage 14 includes a multiplication capacitor 24 (e.g., 22 nanofarads) with switches 26 coupled to both of its two nodes. The switches 26 may be any conventional switches, such as field effect transistors. Moreover, as known by those in the art, the multiplication capacitor 24 can be a single capacitor, or a plurality of other electronic components that together form a desired capacitance for the given application.

In addition to the switches 26 and multiplication capacitor 24, each stage 14 also may have an output reservoir capacitor 28 (e.g., 47 nanofarads) for storing the output voltage it produces. Accordingly, the first stage 14A may have a first output reservoir capacitor 28A for delivering an output voltage that is double the input voltage, the second stage 14B may have a second output reservoir capacitor 28B for delivering an output voltage that is four times the input voltage Vin, and the third stage 14C may have a third output reservoir capacitor 28C for delivering an output voltage that is eight times the input voltage. If a given application does not use intermediate voltages (i.e., two or four times the input voltage Vin), then the output reservoir capacitors 28A and 28B for the first and second stages 14A and 14B can be eliminated.

The switches 26 of each stage 14 are synchronized to switch in a specific manner that produces the desired results. To that end, the switches 26 are coordinated so that each stage 14 switches between a charging state and an output state. When a stage 14 is in the charging state, its multiplication capacitor 24 is in parallel with its input voltage and thus, charges to a voltage having a substantially equal value. Conversely, when a stage 14 is in the output state, its multiplication capacitor 24 is in series between the high sides of the input voltage and its output. Accordingly, when in this state, a stage 14 is capable of delivering its output voltage to the next stage 14. This output voltage may be used either as the output voltage (if the last stage 14), or to charge the multiplication capacitor 24 in a succeeding stage 14. In FIG. 3, the switches 26 are coupled to the nodes designated as "C" when in the charging state, and to the nodes designated as "O" when in the output state.

In illustrative embodiments, the switches 26 are configured so that each stage 14 switches at a rate that is half that of its immediately preceding stage 14. Accordingly, in the voltage multiplier 10 shown in FIG. 3, if the first stage 14A switches at a frequency F, then the second stage 14B switches at a F/2, and the third stage 14C switches at a frequency of F/4. Any conventional timing circuitry may be used to produce these respective frequencies.

Figure 4:
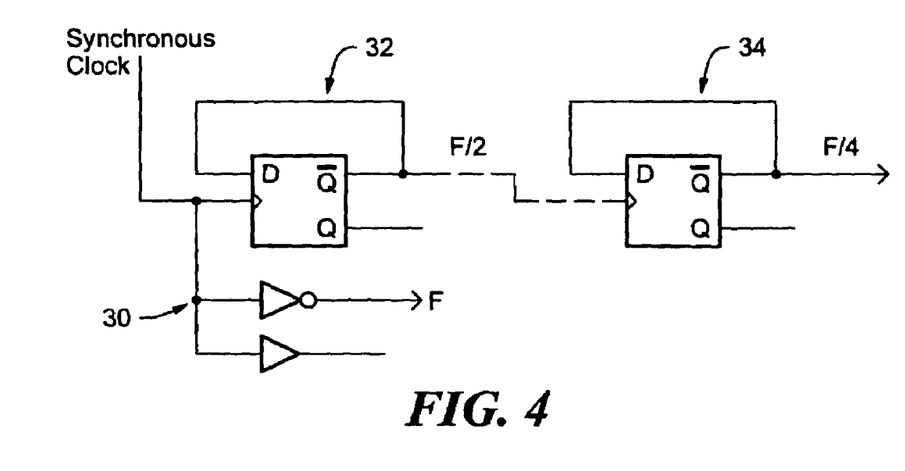
FIG. 4 schematically shows clock circuitry that may be used in illustrative embodiments of the invention.

FIG. 4 schematically shows one circuit arrangement that may be used to divide the base frequency F. The circuit receives a synchronous dock from some other source, such as from a clock already used by another portion of the overall device. For example, when implemented in a gyroscope, such as the Analog Devices ADXRS2075 (from Analog Devices, Inc. of Norwood, Mass.), the synchronous clock may be generated from a phase locked loop that generates a synchronous signal for another purpose. This synchronous signal is fed to both 1) an inverter 30 to produce the drive signal for the first stage 14A (having frequency F), and 2) to a first flip flop 32 to produce a drive signal for the second stage 14B (having frequency F/2). The output signal of the first flip flop 32 then is fed to the second flip flop 34 to produce a drive signal for the third stage 14C (having frequency F/4). Additional flip flop stages can be added if the voltage multiplier 10 has more multiplication stages 14.

Figure 5:
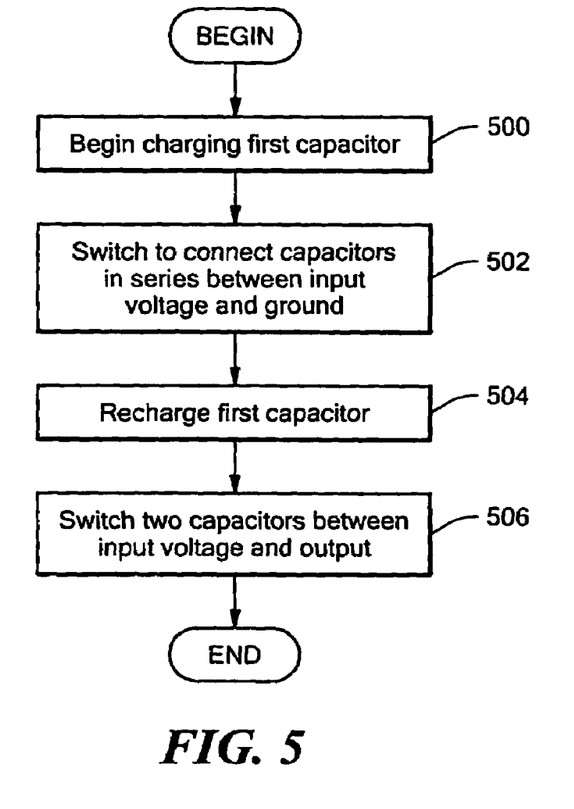
FIG. 5 shows the switching process used by the different stages of one embodiment of the invention to multiply an input voltage.

FIG. 5 shows an exemplary switching process used to switch the stages 14 of a two stage voltage multiplier 10. A two stage voltage multiplier 10 configured in accord with illustrative embodiments multiplies the input voltage Vin by four, and can be produced when taking the output voltage across the output reservoir capacitor 28B in the second stage 14B of the multiplier 10 in FIG. 3. Two stages 14A and 14B, rather than three stages 14A–14C, are discussed in FIG. 5 for simplicity. FIGS. 6A–6D illustrate the process of FIG. 5 as it progresses. Note that each step in FIG. 5 and accompanying illustration in FIGS. 6A–6D occurs with each switch 26 of the first stage 14A—i.e., at a rate of frequency F.

Figure 6A:
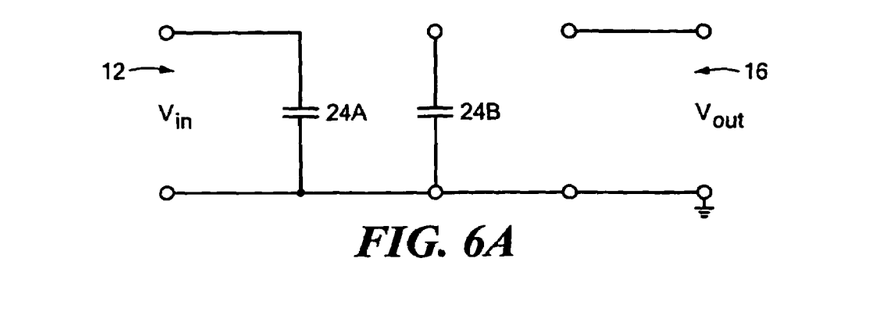
FIGS. 6A–6D schematically show different states of the voltage multiplier discussed in FIG. 5.
Figure 6B:
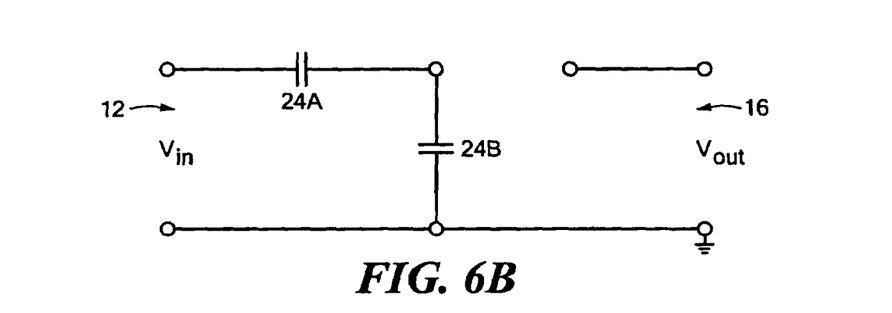

The process begins at step 500, in which the first multiplication capacitor 24A (i.e., the multiplication capacitor of the first stage 14A) begins charging. To that end, as shown in FIG. 6A, the first multiplication capacitor 24A is in parallel with the input voltage Vin, while the second multiplication capacitor 24B has one node connected to ground, and an open circuit at its other node. The process continues to step 502, in which the first multiplication capacitor 24A switches to serially connect between the input voltage Vin and the second multiplication capacitor 24B (see FIG. 6B). As a result of this switch, the second multiplication capacitor 24B charges to a value of about two times the input voltage Vin. It should be noted that the second multiplication capacitor 24B did not switch between FIGS. 6A and 6B because it is switching at half the rate of the first multiplication capacitor 24A.

Figure 6C:
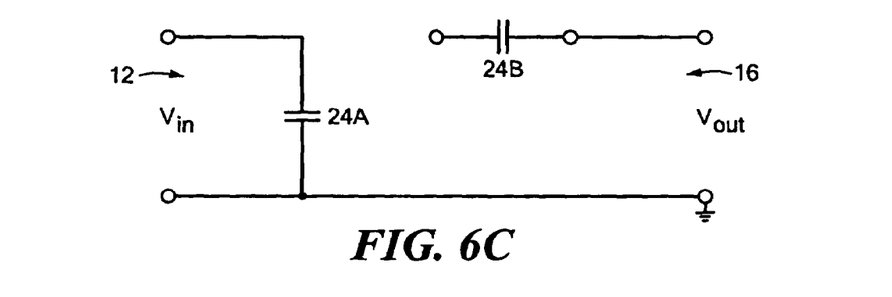

The process then continues to step 504, in which both stages 14 switch. Specifically, as shown in FIG. 6C, the first multiplication capacitor 24A switches back to be in parallel with the input voltage Vin. As a consequence, it recharges with charge lost during the preceding steps. The second multiplication capacitor 24B also switches to be in series with the high side of the output port 16. Although coupled with the output port 16, the second multiplication capacitor 24B is an open circuit and thus, substantially maintains its voltage (i.e., twice of the input voltage Vin).

Figure 6D:
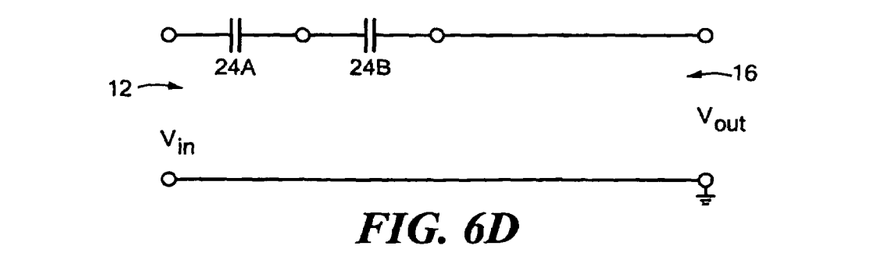

The process then continues to step 506, in which the first multiplication capacitor 24A switches again to be serially connected between the high side of the input voltage Vin and the second multiplication capacitor 24B (FIG. 6D). Unlike the previous time it was in series with the second multiplication capacitor 24B (i.e., FIG. 6B), the first multiplication capacitor 24A and second multiplication capacitor 24B are serially connected between the high sides of the input and output ports 12 and 16. As a result, the output voltage is the sum of the voltages across both capacitors and the input voltage Vin. Specifically, the output voltage is equal to the sum of the input voltage Vin, the voltage across the first multiplication capacitor 24A (i.e., also equal to the input voltage Vin), and the voltage across the second multiplication capacitor 24B (i.e., twice the input voltage Vin, as charged at step 502). This sum is equal to four times the input voltage Vin.

The voltage produced at the output of the voltage multiplier 10 thus is equal to the product of the input voltage Vin and two raised to the N power (i.e., Vout=Vin*$2^N$), where N equals the total number of stages 14. In illustrative embodiments, each stage 14 has no more than one multiplication capacitor 24 and thus, N equals the total number of capacitors. Accordingly, unlike the prior art voltage multiplier discussed in the Background section, every stage 14 effectively doubles the output voltage at the output port 16. Compared to the prior art, this doubling can produce a rather large voltage with fewer stages 14.

The voltage multiplier 10 discussed above, however, delivers the fully multiplied output voltage to the output port 16 in accordance with the following equation:

Frequency that maximum output voltage is delivered=$1/(2)^N$, where N equals the number of stages 14. N also equals the total number of multiplication capacitors 24 when each stage 14 has a single capacitor.

Figure 7:
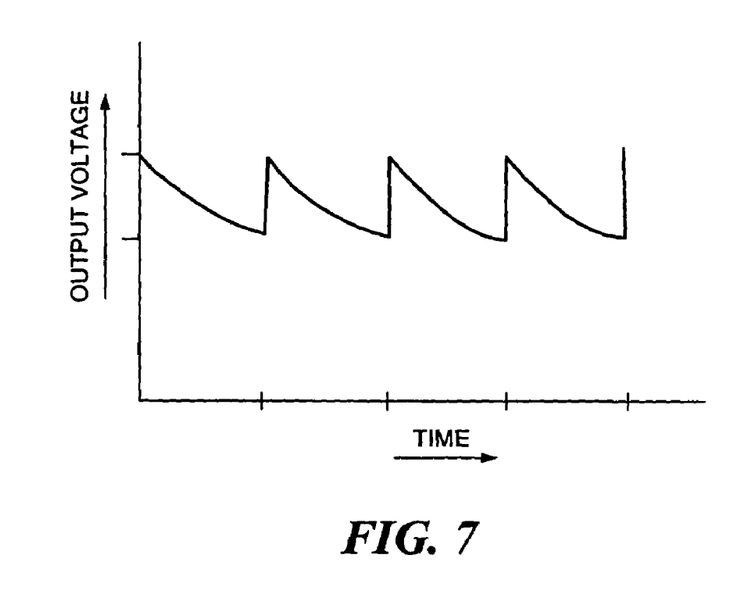
FIG. 7 graphically shows voltage ripple that may occur across an output capacitor of illustrative embodiments of the invention.

FIG. 7 graphically shows the output voltage ripple across the output port 16 of the embodiment shown in FIGS. 5 and 6A–6D. Each block of time shown is equal to $1/(2)^N$. Accordingly, as shown, the voltage begins at its maximum value, and decays down to a minimum voltage as a function of the output reservoir capacitor 28 of the final stage 14C. In illustrative embodiments, a relatively large capacitor may be used to minimize the ripple voltage. Alternatively, instead of (or in addition to) providing a relatively large output reservoir capacitor 28, the drive frequency F could be increased.

The switching sequence of FIGS. 5 and 6A–6D is but one of a wide variety of sequences that may be used. Substantially the same voltage multiplication benefits can be achieved by changing the switching sequence of the different stages 14. FIGS. 8 and 9A–9D show one such exemplary alternative embodiment (referred to herein as the "Backward Sequence"), in which each stage 14 switches at a rate that is twice that of its immediately preceding stage 14. Accordingly, with this alternative arrangement, the first stage 14A switches at a rate that is half that of the second stage 14B. To illustrate this, the process in FIG. 8 begins at step 800, in which the first multiplication capacitor 24A begins charging (similar to step 500 of FIG. 5 and FIG. 6A). To that end, as shown in FIG. 9A, the first multiplication capacitor 24A is in parallel with the input voltage Vin, while the second multiplication capacitor 24B has one node connected to ground and an open circuit at its other node. The second multiplication capacitor 24B then switches to couple with the output port 16 (FIG. 9B). This action does not have a corresponding step in FIG. 8 because it has minimal impact on the multiplier 10.

Figure 9A:
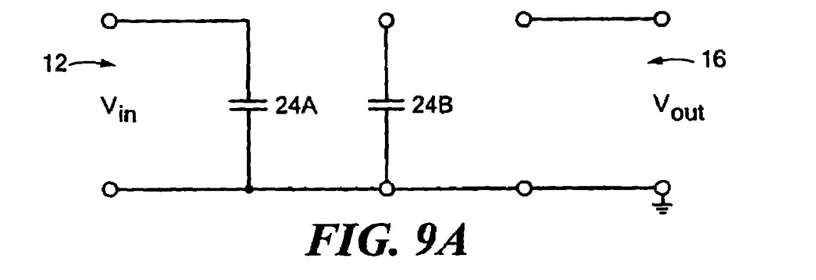
FIGS. 9A–9D schematically show different states of the voltage multiplier discussed in FIG. 8.
Figure 9B:
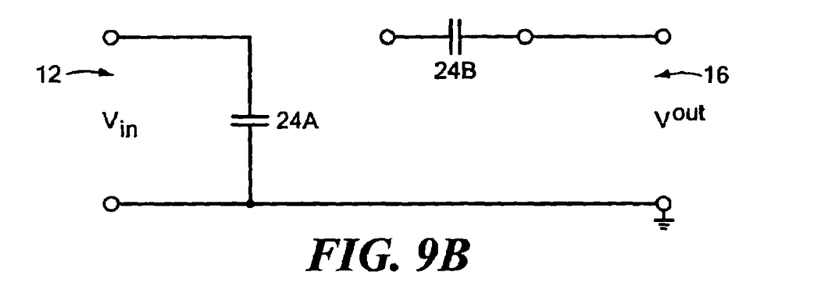
Figure 9C:
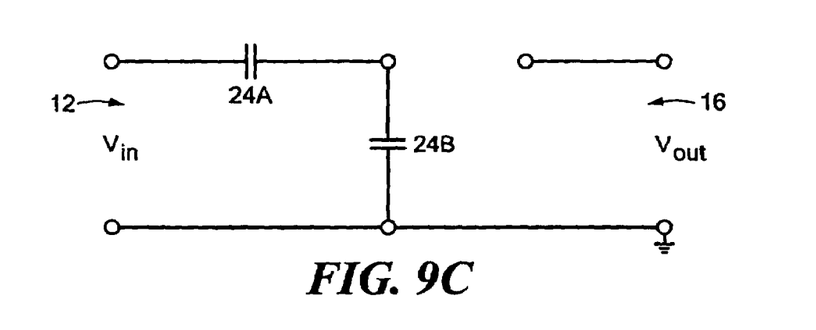

The process continues to step 802, in which both multiplication capacitors 24A and 24B switch. Specifically, as shown in FIG. 9C, the first multiplication capacitor 24A switches to serially connect between the input voltage Vin and the second multiplication capacitor 24B. At substantially the same time, the second multiplication capacitor 24B switches to be serially connected between the first multiplication capacitor 24A and ground. As a result of this switch, the second multiplication capacitor 24B charges to a value of about two times the input voltage Vin.

Figure 9D:
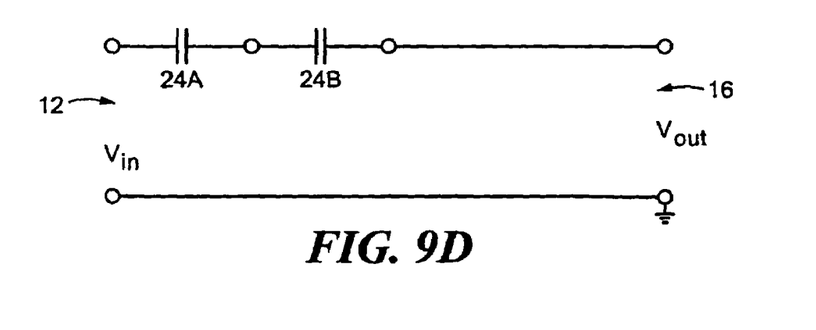

After the second multiplication capacitor 24B charges, it switches to be in series between the first multiplication capacitor 24A and the high side of the output port 16 (step 504 and FIG. 9D). Accordingly, in a manner similar to the switching sequence discussed above with regard to FIGS. 5 and 6A–6D, this switching sequence produces an output voltage that is four times greater than the input voltage Vin. Also in a manner similar to the other noted switching sequence discussed above, this switching sequence provides the maximum voltage to the output port 16 once every $1/(2)^N$ times.

Figure 8:
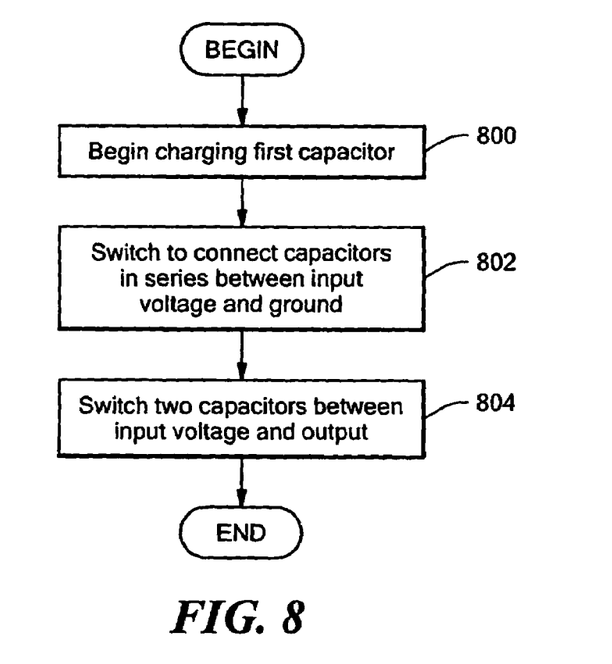
FIG. 8 shows the switching process used by the different stages of another embodiment of the invention to multiply an input voltage.

Although the switching sequence discussed in FIG. 8 produces the desired results, it is anticipated that the switching sequence discussed in FIG. 5 operates more efficiently. Among other reasons, because the sequence of FIG. 8 does not recharge the first multiplication capacitor 24A after it charges the second stage 14B, it may deplete some of its charge by charging the second multiplication capacitor 24B. Consequently, the output voltage at the end of the process may be less than four times the input voltage. This is in contrast to the process in FIG. 5, in which the first multiplication capacitor 24A recharges its voltage after it charges the second multiplication capacitor 24B.

More generally, as noted above, it has been determined that when cascading N stages 14 in the manner shown in FIG. 3, the idealized output voltage will substantially comply with the following equation:

$$Vout = (2)^N * Vin$$

provided that the intermediate stages 14 have performed a sequence of steps that transfer charge from the first input to the last output. That sequence should include 1) at least one state in which all stages 14 are in an output state O, and 2) at least one state for each stage 14 where that block is in the charging state C while all stages 14 between it and the input are in the output state O. Simulations have shown that the exact order of this sequence only affects efficiency; it does not prevent the voltage multiplication from occurring.

Accordingly, based upon the above noted requirements, a shorter switching sequence should be able to accomplish the same voltage multiplication function. In such case, the output voltage reaches its peak in much less time than in the cases discussed with regard to FIGS. 5, 6A–6D, 8, and 9A–9D. For a four stage voltage multiplier 10, for example, the following switch sequence cycle can be used (i.e., the listed five switch sequences are repeated) where X is a "don't care," open circuit condition:

| SHORT SEQUENCE | | | | |
| --- | --- | --- | --- | --- |
| | Stage 1 | Stage 2 | Stage 3 | Stage 4 |
| Cycle 1 | C | X | X | X |
| Cycle 2 | O | C | X | X |
| Cycle 3 | O | O | C | X |
| Cycle 4 | O | O | O | C |
| Cycle 5 | O | O | O | O |

Such a timing sequence (the "Short Sequence") can be produced in any manner known in the art, such as by circulating a single bit through a five-stage shift register. The temporal order of the five above listed cycles can be changed while still preserving the voltage multiplication functionality. One problem with this sequence, however, is that the first stage 14 is used four times to charge a succeeding stage 14 without replenishing its own voltage. If the load is light, then the resulting output voltage should be close to desired output voltage (i.e., $Vin*2^N$), or $Vin*16$. If the load is not light, however, then charge is continually depleted from the output port 16, which can substantially deplete the stages 14 nearer the input port 12.

One way to remedy this problem is to add states that replenish some of the stages 14 near the input after they are used to charge a succeeding stage 14. The below listed switching sequence cycle, referred to as the "Long Sequence," should provide improved results:

| LONG SEQUENCE | | | | |
| --- | --- | --- | --- | --- |
| | Stage 1 | Stage 2 | Stage 3 | Stage 4 |
| Cycle 1 | C | C | C | C |
| Cycle 2 | O | C | C | C |
| Cycle 3 | C | O | C | C |
| Cycle 4 | O | O | C | C |
| Cycle 5 | C | C | O | C |
| Cycle 6 | O | C | O | C |
| Cycle 7 | C | O | O | C |
| Cycle 8 | O | O | O | C |
| Cycle 9 | C | C | C | O |
| Cycle 10 | O | C | C | O |
| Cycle 11 | C | O | C | O |
| Cycle 12 | O | O | C | O |
| Cycle 13 | C | C | O | O |
| Cycle 14 | O | C | O | O |
| Cycle 15 | C | O | O | O |
| Cycle 16 | O | O | O | O |

Although this switching sequence cycle should provide improved results, it adds much more time to the entire switching cycle. In other words, it takes much longer for the output reservoir capacitor 28 to be fully charged by this switching sequence. This increased time can effectively negate the improvement provided by replenishing the stages 14 nearer the input port 12. As a compromise, the following "mixed" switching sequence was derived:

| MIXED SEQUENCE | | | | |
|---|---|---|---|---|
| | Stage 1 | Stage 2 | Stage 3 | Stage 4 |
| Cycle 1 | C | C | C | C |
| Cycle 2 | O | C | C | C |
| Cycle 3 | C | O | C | C |
| Cycle 4 | O | O | C | C |
| Cycle 5 | C | C | O | C |
| Cycle 6 | O | C | O | C |
| Cycle 7 | O | O | O | C |
| Cycle 8 | O | O | O | O |

One way of determining efficiency (i.e., effectiveness of charge transfer) is by calculating the mean output resistance, which is the ratio of diminution of mean output voltage to the change in load current. A smaller output resistance is desirable. As suggested above, this resistance can be made arbitrarily small by increasing the capacitance in each block or increasing the switch frequency. In practice, however, there often are application specific constraints on both frequency and capacitor size. Accordingly, it is desirable to optimize the switching sequence. Below is a table of calculated output resistances (in mega-ohms) of several different noted switching configurations, where the multiplication capacitors 24 are 10 nanofarads, the input voltage Vin is five volts, and the base clock is twenty kilohertz. This table was calculated by simulation software:

| OUTPUT RESISTANCES OF VARIOUS SEQUENCES | | | |
|---|---|---|---|
| | Mult. Factor: 4 | Mult. Factor: 8 | Mult. Factor: 16 |
| Short Sequence | 0.065 | 0.315 | 1.5 |
| Forward Sequence (FIGS. 5 and 6A–6D and similar to Long Sequence) | 0.059 | 0.28 | 1.2 |
| Backward Sequence (FIGS. 8 and 9A–9D) | 0.31 | 1.2 | 4.7 |
| Mixed Sequence | 0.045 | 0.22 | 1.0 |

As shown in the above table, lengthening the sequence from the Short sequence to the Backward Sequence produces an output resistance that is between about 3–5 times larger. The Mixed Sequence thus appears to provide the best efficiency of the listed sequences due to its lowest output resistance values.

Accordingly, compared to prior art voltage multipliers, embodiments of the invention use fewer capacitors to provide vastly improved multiplication. As a consequence, devices implementing these embodiments can be smaller and produced at a reduced cost while providing high output voltages.

Although various exemplary embodiments of the invention are disclosed above, it should be apparent to those skilled in the art that various changes and modifications can be made that will achieve some of the advantages of the invention without departing from the true scope of the invention.

What is claimed is:

1. A voltage multiplier comprising a plurality of successive stages including a first stage and at least one successive stage, each stage including:
   an input terminal for receiving an input voltage and an output terminal for outputting an output voltage, the input terminal of the first stage connectable to a voltage source, the input terminal of each successive stage coupled to the output terminal of its immediately preceding stage for receiving an output voltage produced by its immediately preceding stage;
   a capacitive circuit having first and second terminals of opposite polarities;
   a first switch coupled to said first terminal for selectively coupling said first terminal to one of said input terminal and said output terminal; and
   a second switch coupled to said second terminal for selectively coupling said second terminal to one of a common terminal and said input terminal, wherein the first and second switches of each stage are controllable to alternate between a charging state in which said first terminal is coupled to said input terminal and said second terminal is coupled to said common terminal and an output state in which said first terminal is coupled to said output terminal and said second terminal is coupled to said input terminal, wherein the first and second switches of the first stage are controlled at a first switching frequency and the first and second switches of each successive stage are controlled at approximately half the switching frequency of its immediately preceding stage.

2. A voltage multiplier according to claim 1, wherein the capacitive circuit of at least one stage includes a single capacitor.

3. A voltage multiplier according to claim 1, wherein the capacitive circuit of at least one stage includes a plurality of electrical components that together form a desired capacitance.

4. A voltage multiplier according to claim 1, wherein the common terminal is a ground terminal.

5. A voltage multiplier according to claim 1, wherein, in each stage, a predetermined voltage is stored in the capacitive circuit during the charging state and the output voltage of the stage, produced during the output state, is substantially equal to the input voltage to the stage plus the stored voltage.

6. A voltage multiplier according to claim 5, wherein, in each stage, the stored voltage is substantially equal to the input voltage to the stage and the output voltage of the stage is substantially equal to twice said input voltage.

7. A voltage multiplier according to claim 1, wherein at least one stage further comprises an output reservoir capacitor coupled between said output terminal and said common terminal.

8. A voltage multiplier according to claim 1, further comprising:
   a controller for controlling the first and second switches of each stage to alternate between the charging state and the output state.

* * * * *